US012702996B2

(12) United States Patent
Bravidor et al.

(10) Patent No.: US 12,702,996 B2
(45) Date of Patent: Aug. 11, 2026

(54) DYNAMIC DRIFT CONTROL

(71) Applicant: BAYER AKTIENGESELLSCHAFT, Leverkusen (DE)

(72) Inventors: Josephine Bravidor, Berlin (DE); Yves Jaschinski, Solingen (DE); Dennis Göke, Cologne (DE); Robert Wollenhaupt, Langenfeld (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 529 days.

(21) Appl. No.: 18/019,746

(22) PCT Filed: Aug. 2, 2021

(86) PCT No.: PCT/EP2021/071525
§ 371 (c)(1),
(2) Date: Feb. 3, 2023

(87) PCT Pub. No.: WO2022/029055
PCT Pub. Date: Feb. 10, 2022

(65) Prior Publication Data

US 2023/0294122 A1 Sep. 21, 2023

(30) Foreign Application Priority Data

Aug. 7, 2020 (EP) .................................... 20190080

(51) Int. Cl.

| | |
|---|---|
| ***B05B 12/12*** | (2006.01) |
| ***A01C 23/04*** | (2006.01) |
| ***A01M 7/00*** | (2006.01) |
| ***B05B 12/16*** | (2018.01) |

(52) U.S. Cl.
CPC ............ *B05B 12/12* (2013.01); *A01C 23/047* (2013.01); *A01M 7/0089* (2013.01); *B05B 12/16* (2018.02)

(58) Field of Classification Search
CPC .... A01M 7/0089; A01C 23/047; B05B 12/12; B05B 12/16; A01B 79/005
See application file for complete search history.

(56) References Cited

U.S. PATENT DOCUMENTS

| | | | | |
|---|---|---|---|---|
| 6,726,120 | B2 | 4/2004 | Schaffter et al. | |
| 2012/0169504 | A1 * | 7/2012 | Hillger ................ | A01M 7/0089 340/603 |
| 2016/0368011 | A1 * | 12/2016 | Feldhaus ............... | B05B 12/124 |
| 2020/0051035 | A1 * | 2/2020 | Rossetti .............. | G06F 16/9024 |

FOREIGN PATENT DOCUMENTS

| | | | |
|---|---|---|---|
| EP | 1321037 | A2 | 6/2003 |
| EP | 2022329 | A2 | 2/2009 |
| EP | 2921050 | A1 | 9/2015 |
| WO | WO97/12688 | A1 | 4/1997 |
| WO | WO2005/034622 | A1 | 4/2005 |

* cited by examiner

*Primary Examiner* — Tuongminh N Pham
(74) *Attorney, Agent, or Firm* — Harness, Dickey & Pierce, P.L.C.

(57) ABSTRACT

The present invention is concerned with the application of biological and/or chemical substances or mixtures of substances, more particularly of crop protection products, and/or nutrients outdoors. Subjects of the present invention are a method, a computer system, an apparatus and a computer program product for dynamically adapting application parameters to variable air movements.

14 Claims, 14 Drawing Sheets

Figure 1:
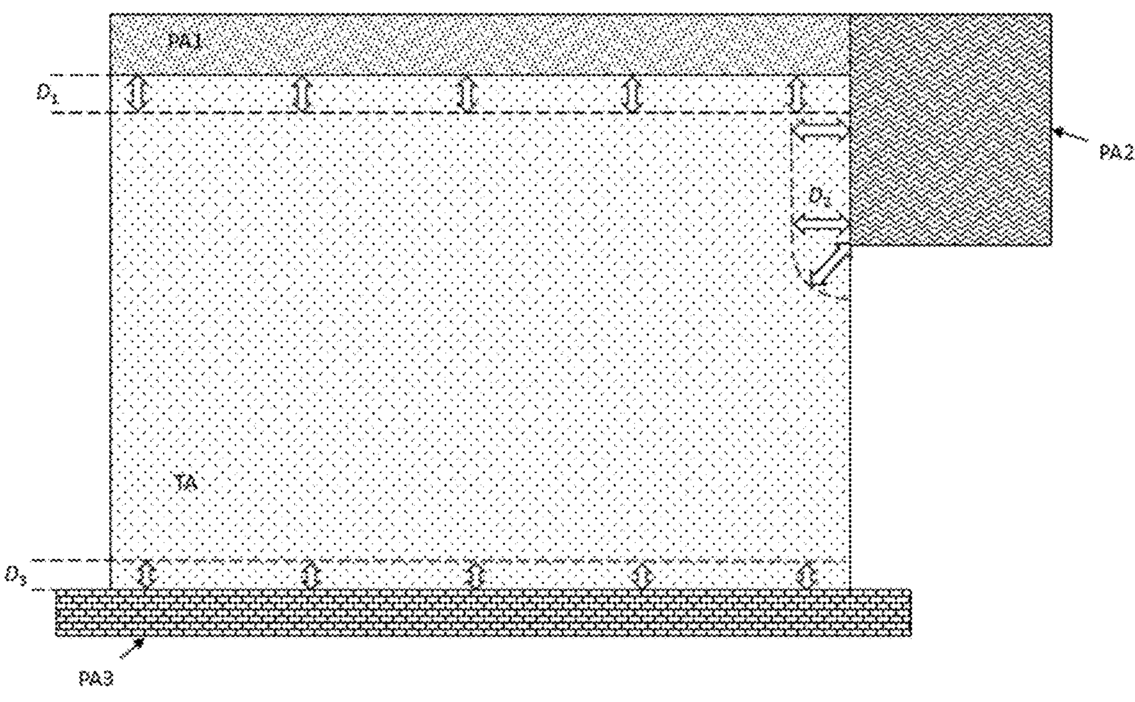

(c)
PB
S1
S2
S3
S4

(b)
PB
S1
S2
S3
S4

DYNAMIC DRIFT CONTROL

CROSS-REFERENCE TO RELATED APPLICATIONS

This application is a U.S. national stage filing under 35 U.S.C. § 371 of International Application No. PCT/EP2021/071525, filed on Aug. 2, 2021, which claims the benefit of, and priority to, European Patent Application No. 20190080.0, filed on Aug. 7, 2020. The entire disclosure of each of the above applications is incorporated herein by reference.

The present invention is concerned with the application of biological and/or chemical substances or mixtures of substances, more particularly of crop protection products, and/or nutrients outdoors. Subjects of the present invention are a method, a computer system, an apparatus and a computer program product for dynamically adapting application parameters to variable air movements.

A possibility during the application of crop protection products is that some of the crop protection product is distributed in an uncontrolled way owing to wind. The portion of the crop protection product which fails to reach the intended target, but is instead carried by wind, for example, to other sites, is referred to as off-target drift. It is possible that such sites may be areas in which crop protection products are unwanted or prohibited. Examples would include bodies of natural water, residential areas, environmental non-target areas and/or similar.

The same is true of plant nutrients which in the cultivation of crop plants are applied to fields for fertilization; here as well, the entry of nutrients into bodies of natural water, for example, is to be prevented.

In the control of unwanted vegetation on railway tracks, industrial land, roads, public places and the like, it is also necessary to ensure that herbicides do not pass as a result of drift into unwanted areas.

There is therefore a need to prevent uncontrolled wind carriage of biological and/or chemical substances or mixtures of substances as a result of wind into areas in which they are unwanted or prohibited.

This object is achieved by the subjects of the independent claims. Preferred embodiments are found in the dependent claims, in the present description and also in the drawings.

A first subject of the present invention is a method comprising the steps of:

- applying a spray product in accordance with defined application parameters in a target area by means of a spray apparatus, wherein the spray apparatus comprises at least one spray nozzle and the target area comprises at least one non-target area, and/or borders on at least one non-target area and/or is located in a vicinity of at least one non-target area,
- during the applying:
  - determining a direction of an air movement,
  - determining a position of the at least one spray nozzle,
  - for each non-target area present: ascertaining a buffer zone corresponding to the non-target area, with the buffer zone extending from the at least one spray nozzle in the direction of the air movement,
  - examining whether there is an overlap between the at least one non-target area and its corresponding buffer zone,
  - in the event of an overlap: adapting application parameters to prevent the overlap,
- continuing the applying using the adapted application parameters.

A further subject of the present invention is a spray apparatus comprising:

- means for moving the spray apparatus in or over a target area, with the target area comprising at least one non-target area, and/or bordering on at least one non-target area and/or being located in a vicinity of at least one non-target area,
- at least one spray nozzle,
- means for delivering spray product via the at least one spray nozzle,
- means for determining the position of the at least one spray nozzle in the target area,
- a sensor for ascertaining a direction of an air movement,
- a control and processing unit,
- where the control and processing unit is configured continually to determine the position of the at least one spray nozzle in the target area during the application of spray product in accordance with defined application parameters, continually to receive measurement data on the direction of the air movement, and, on the basis of the position and of the measurement data received, to ascertain for each non-target area present a corresponding buffer zone, with the buffer zone extending from the at least one spray nozzle in the direction of the air movement,
- where the control and processing unit is configured to examine whether there is an overlap between the at least one non-target area and its corresponding buffer zone, and, in the event that there is at least one overlap, to alter the application parameters in such a way that there is no longer any overlap.

A further subject of the present invention is a computer system comprising

- a receiving unit
- a control and processing unit and
- an output unit
- where the control and processing unit is configured to cause the receiving unit continually to ascertain a position of at least one spray nozzle on a spray apparatus in a target area, with the target area comprising at least one non-target area, and/or bordering on at least one non-target area and/or being located in a vicinity of at least one non-target area, where the spray apparatus moves in or over the target area and applies spray product in accordance with defined application parameters via the at least one spray nozzle,
- where the control and processing unit is configured to cause the receiving unit continually to receive a direction of an air movement,
- where the control and processing unit is configured to ascertain, on the basis of the position of the at least one spray nozzle and the direction of the air movement, for each non-target area present, a corresponding buffer zone, with the buffer zone extending from the at least one spray nozzle in the direction of the air movement,
- where the control and processing unit is configured to examine whether there is an overlap between the at least one non-target area and its corresponding buffer zone, and, in the event that there is at least one overlap, to alter the application parameters in such a way that there is no longer any overlap, or to cause the output unit to output one or more signals which lead to a change in the application parameters so that there is no longer any overlap.

A further subject of the present invention is a computer program product comprising a computer program which can be loaded into a main memory of a computer system where it causes the computer system to execute the following steps:

ascertaining a position of at least one spray nozzle on a spray apparatus in a target area, with the target area comprising at least one non-target area, and/or bordering on at least one non-target area and/or being located in a vicinity of at least one non-target area, with the spray apparatus moving in or over the target area and applying spray product in accordance with defined application parameters via the at least one spray nozzle, receiving a direction of an air movement, for each non-target area present: ascertaining a corresponding buffer zone on the basis of the position of the at least one spray nozzle and of the direction of the air movement, with the buffer zone extending from the at least one spray nozzle in the direction of the air movement, examining whether there is an overlap between the at least one non-target area and its corresponding buffer zone, in the event that there is at least one overlap: outputting one or more signals which lead to an alteration of the application parameters so that there is no longer any overlap.

The invention is elucidated in more detail below, without distinction between the subjects of the invention (method, computer system, apparatus, computer program product). The elucidations which follow are intended instead to be valid analogously for all subjects of the invention, irrespective of the context (method, computer system, apparatus, computer program product) in which they are made.

When steps in a sequence are stated in the present description or in the claims, this does not necessarily mean that the invention is restricted to the stated sequence. It is instead possible for the steps to be executed also in a different sequence or else in parallel with one another, except when one step builds on another step, so necessitating the building step to be executed subsequently (something which in that specific case, however, will be clear). The stated sequences therefore represent preferred embodiments of the invention.

Certain aspects of the present invention are elucidated using drawings, for illustration, without any intention that the invention be restricted to the features and combinations of features that are represented in the drawings.

The present invention provides means with which, during the application of a spray product in a target area, the application parameters are adapted automatically and continually (dynamically) to altering air movements, in order to prevent off-target drift into other areas.

The target area is the territory in which spray product is, or is to be, applied. The target area may be, for example, a field for the cultivation of crop plants. In such an event, the spray product is preferably a crop protection product and/or nutrients for the cultivated plants.

The term "crop protection product" refers to a composition which is used to protect plants or plant products from harmful organisms or to prevent such exposure, to destroy unwanted plants or plant parts, to inhibit unwanted growth of plants or to prevent such growth, and/or, in another way, as nutrients, to influence the life events of plants (e.g. growth regulators). Growth regulators are employed, for example, for increasing the lodging resistance in cereals by shortening the culm length (culm shorteners or, better, internode shorteners), improving the rooting of nursery plants, reducing plant height by stunting in horticulture, or preventing the germination of potatoes. Other examples of crop protection products are herbicides, fungicides and pesticides (e.g. insecticides).

"Nutrients" are those organic and inorganic compounds from which plants are able to derive the elements of which their bodies are made. Depending on the location of the plant, the nutrients are taken from the air, the water and/or the soil. These nutrients are often not in the quantity and form in which they can best be utilized. Either they are not present in sufficient quantity naturally, or they are displaced, for example, by leaching in the soil, or are withdrawn from the soil in considerable quantities by the harvested products. These withdrawals of nutrients can be replaced only by supplying plant nutrients through fertilization. Fertilization therefore improves the nutrition of the plant, promotes plant growth, increases yield, improves the quality of the harvested products, and, lastly, maintains and promotes soil fertility. In this description the term "nutrients" is used synonymously with the term "fertilizers".

The target area may, however, also be industrial land, railway tracks, roads, paths, squares and/or the like which are to be freed from unwanted vegetation. In such an event, the spray product is preferably a herbicide.

In general the spray product is a biological substance and/or a chemical substance or a mixture of such substances. The spray product is used in order to generate a defined effect in the target area (to prevent or promote plant growth, to prevent the spread of harmful organisms and/or the like). Typically, however, there are areas in, on and/or around the target area in which this effect is undesirable. The aim is to prevent the spray product entering these areas on delivery in the target area. Such areas are referred to in this description as non-target areas.

A "non-target area" is an area within the target area and/or an area bordering on the target area and/or an area in the vicinity of the target area, into which the spray product is not to enter. In this context the term "vicinity" embraces all areas into which spray product can be carried as a result of air movements (primarily wind) when the spray product is being delivered in the target area. Typically this is an area having a distance from the target area of less than a kilometre, preferably of not more than 100 metres.

A non-target area may be, for example, a path or a road onto which no spray product is to enter. A non-target area may be, for example, a body of water (stream, pond, lake, river, sea) into which no spray product is to enter. A non-target area may be, for example, a flower strip or a green strip which is intended to promote the local biodiversity. A non-target area may be, for example, an adjoining field. A non-target area may be, for example, a wood or a meadow or a pasture or an environmental protection area or a residential area. A non-target area may be a clump of bushes or a hedge, or a plurality of clumps of bushes and/or hedges. A non-target area may be a habitat for non-target organisms, with the term "non-target organisms" indicating that the spray product is not intended for spraying the non-target organisms. A non-target area may also be an area in which a person and/or an animal or a plurality of persons and/or animals are residing. A non-target area need not be static, but instead may be dynamic; for example, it may be an object or a being which is moving in or over a target area or past a target area. The non-target area may encompass the object and/or being and also a defined region around the object and/or being. It is conceivable for one or more sensors (e.g. movement sensors, cameras and/or the like) to capture an object and/or a being automatically and continually and to ascertain a defined non-target area around the object and/or being.

With preference not only the target area but also (static) non-target areas present in, on and/or around the target area are entered on a digital map or can be entered onto a digital map by a user (e.g. drawn in on a computer by means of a mouse). A digital map of this kind is a representation of part of the Earth's surface. The term "digital" denotes that the map can be processed by a machine, in general a computer system. "Processing" refers to the known techniques of electronic data processing (EDP).

In the case of dynamic non-target areas, the non-target areas may, as described above, be ascertained continually and automatically and recorded on a digital map, and the map can be updated in the event of alterations in relation to the size and/or position and/or shape of a non-target area.

For each of these non-target areas, preferably, a minimum distance is defined, which is to be/must be observed at the least on application of a (defined) spray product. This minimum distance may be a requirement of statute and/or of authorities and/or may be part of best practices and/or may arise from another requirement.

FIG. 1 illustratively shows schematically a target area (TA) having a first bordering non-target area (PA1), a second bordering non-target area (PA2) and a third bordering non-target area (PA3).

A first minimum distance ($D_1$) from the first non-target area (PA1) must be/is to be observed on application of a spray product. A second minimum distance ($D_2$) from the second non-target area (PA2) must be/is to be observed on application of a spray product. A third minimum distance ($D_3$) from the third non-target area (PA3) must be/is to be observed on application of a spray product. In the present example: $D_3<D_1<D_2$.

Typically the observance of the minimum distance is intended to have the effect that spray product delivered in the target area does not—due to wind, for example—pass into a non-target area. The static observance of the minimum distance, independently of the wind direction and of a resulting off-target drift, may lead, however, to an effective reduction in the size of the target area—to a reduction in the size of the cultivation area in the case of a field for cultivation of crop plants. Furthermore, as a result of the minimum distance, not all regions of a target area may be treated with a spray product—there is a risk of the spread of harmful organisms and/or a risk of resistances to the spray product developing in harmful organisms, and/or it is necessary to take other, usually more elaborate measures in order to treat regions lying within the minimum distance as well. It is also conceivable that in the case of the cultivation of crop plants, the non-treatment or inadequate treatment of partial areas within the target area implies a loss of yield. These disadvantages are eliminated by the present invention. With the present invention, during the application of spray product, there is continuous and automatic identification of those regions into which spray product may pass as a result of altering air movements, and the application parameters are adapted so as to prevent spray product being carried into non-target areas.

A spray product is applied in a target area using a spray apparatus. A spray apparatus of this kind typically possesses means for moving the spray apparatus in or over the target area. The spray apparatus may be, for example, a motor-driven agricultural machine, a manned or unmanned aircraft (e.g. a drone) or a robot. The movement of the spray apparatus in or over the field may take place autonomously or may be controlled by a person.

The spray apparatus typically has at least one container for accommodating a spray product. It is conceivable for there to be multiple containers, to accommodate, for example, different spray products and/or (different) spray product concentrate(s) and diluent(s) (typically water).

The spray apparatus comprises at least one spray nozzle. The term "spray nozzle" denotes one or more openings from which spray products emerge and can be delivered in the target area. This term "spray nozzle" is not to be understood in a limiting way, being also intended, for example, to encompass a rotating spraying disc.

The spray apparatus preferably comprises a plurality of spray nozzles. The term "plurality" denotes at least two, preferably at least three. Typically there are at least 10 spray nozzles present. Conveying means (e.g. one or more pumps) convey spray product from one or more container(s) in the direction of the at least one spray nozzle. The spray product is delivered in/over the target area via the at least one spray nozzle.

When spray product emerges from the at least one spray nozzle, the spray product wets a defined area in the target area. The size and shape of the wetted area is determined by the application parameters. The application parameters are those parameters which determine the spraying outcome. The application parameters include the type and form of the at least one spray nozzle, the number of spray nozzles used, the arrangement of the spray nozzles, the spray pressure, the type of spray product, the movement velocity of the spray apparatus and/or the like. The size and shape of the wetted area is ascertained empirically. The area that is wetted with spray product is also referred to in this description as "wetting area". A synonymous term is the term "spray zone". The area wetted at standstill of the spray apparatus (the spray apparatus is not moving) is also referred to in this description as the standstill wetting area. The wetting area and the standstill wetting area are preferably the wetted areas which come about in the case of application when there is no wind at all blowing.

The spray apparatus may comprise at least one spray bar. A spray bar of this kind typically has a plurality of spray nozzles, which typically are mounted on the spray bar at a defined distance from one another in such a way that the spray product delivered from the plurality of spray nozzles performs extremely uniform wetting of an area within the target area. The spray bar is typically arranged transversely (preferably perpendicularly) to the movement direction of the spray apparatus, and so, on a straight-line movement of the spray apparatus along a defined section, it sweeps an area whose surface area (in the case of a perpendicular arrangement) corresponds to the product of the width of the spray bar and the length of the defined section.

When spray product is delivered with this straight-line movement, it wets an area whose surface area corresponds to the product of the spray width and the length of the defined section.

Figure 2:
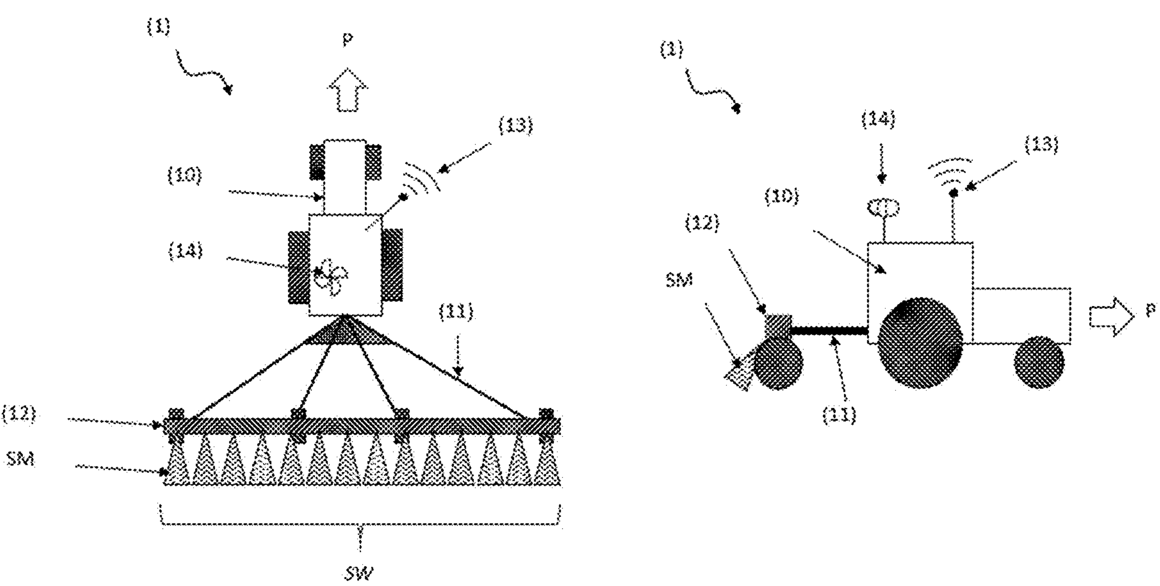

FIG. 2 shows illustratively and schematically an embodiment of the spray apparatus of the invention (a) in a plan view and (b) in a side view. The spray apparatus (1) comprises a tractor (10), which is connected via a linkage (11) to a spray bar (12). The spray bar (12) has a plurality of spray nozzles which are arranged at a uniform distance from one another. Spray product SM departs the spray apparatus via the spray nozzles. When the spray apparatus is moving forwards (in the direction of the arrow P), the spray width is SW.

The spray apparatus in FIG. 2 further comprises a GPS receiver (13). The term "GPS receiver" is intended generally to be interpreted as a constituent of a satellite navigation system. The Global Positioning System (GPS), officially NAVSTAR GPS, is one example of a global satellite navigation system for determining position; other examples are GLONASS, Galileo and Beidou. The satellites in a satellite navigation system of this kind share their precise position and clock time via broadcast codes. For determining position, a receiver (the "GPS receiver") must receive the signals from at least four satellites simultaneously. The receiver measures the pseudo-signal transmit times and from these measurements ascertains the current position.

In FIG. 2 the GPS receiver (13) is mounted on the tractor (10). Alternatively it may be mounted on the linkage (11), on the spray bar (12) and/or near to one of the spray nozzles and/or on another constituent of the spray apparatus. It is also conceivable for there to be multiple GPS receivers (or other positional ascertainment units) present. The aim of the invention is to ascertain, for each non-target area present, a buffer zone which extends from the at least one spray nozzle in the direction of an ascertained air movement. Preferably, therefore, the position of the at least one spray nozzle is ascertained. Where there are multiple spray nozzles present, the position of each spray nozzle present is preferably ascertained. If the GPS receiver is mounted near to a spray nozzle, then the position of the spray nozzle may be equated with the position of the GPS receiver. The term "near" here means that the distance between the spray nozzle and the GPS receiver is preferably less than the positional determination accuracy of the GPS receiver. If the GPS receiver is mounted on the spray apparatus at a distance from the at least one spray nozzle which is greater than the positional determination accuracy of the GPS receiver, then the position of the spray nozzle—given a known arrangement of the spray nozzle on the spray apparatus—may be ascertained, for example, from the position of the GPS receiver, the distance between GPS receiver and spray nozzle, and the movement direction of the spray apparatus.

It should, however, be made clear that a GPS receiver is not absolutely necessary for determining the position of the at least one spray nozzle and/or of the spray apparatus; the positional determination may also be made in other ways, for example via GSM location and/or distance sensors and/or the like.

The spray apparatus in FIG. 2 further comprises an air movement sensor (14). The air movement sensor may be mounted (as shown in FIG. 2) on the tractor (10), on the linkage (11) and/or on the spray bar (12). The nearer the air movement sensor is mounted to the at least one spray nozzle, the more accurately the air movement at the spray nozzle can be ascertained. It is conceivable for there to be multiple air movement sensors present. The spray apparatus, however, need not necessarily comprise an air movement sensor. It is also conceivable for one or more air movement sensors to be set up as stationary sensors in the target area or in the vicinity of the target area.

In accordance with the invention, during the application of spray product, there is continual capture of an air movement direction by means of an air movement sensor or multiple air movement sensors. An air movement sensor measures the direction in which air is moving relative to the air movement sensor. It is also conceivable for the air movement sensor to capture not only the air movement direction but also the velocity of the air moving relative to the air movement sensor. An air movement sensor of this kind may be, for example, a wind vane (anemoscope) and/or a wind meter (anemometer).

On application of spray product in a target area, it is possible that air movements carry parts of the spray product into one or more non-target areas, in which the spray product is unwanted. Such air movements are typically wind. "Wind" refers to an air movement in the Earth's atmosphere. It is also conceivable that the air movement is a slipstream or a combination of wind and slipstream. The slipstream is the "contra-wind" brought about through the motion of a vehicle or aircraft. It therefore has the same velocity as the movement velocity of the vehicle/aircraft and the direction opposite to the movement direction (by 180°).

The at least one air movement sensor continually ascertains the air movement direction relative to the air movement sensor and optionally also the air movement velocity relative to the air movement sensor, and transmits the measurements to a control and processing unit, by radio signal or via a cable connection, for example.

The control and processing unit may be a constituent of the spray apparatus or may be independent of it.

The control and processing unit further draws data continually on the position of the spray apparatus and/or of the at least one spray nozzle, from a GPS receiver, for example.

Optionally it is also possible for the movement velocity of the spray apparatus to be captured and transmitted to the control and processing unit, for which purpose the spray apparatus may be equipped with a tachometer; also conceivable, however, is a velocity determination by means of the GPS receiver (or of another positional determination system) in combination with a chronometer.

The control and processing unit is configured to compute one or more buffer zones continually and automatically, on the basis of the data received (position of the spray apparatus/of the at least one spray nozzle, direction of the air movement, optionally velocity of the air movement, optionally movement velocity of the spray apparatus). Each of these buffer zones corresponds to a non-target area. Each of these buffer zones extends from the at least one spray nozzle in the direction in which the air surrounding the spray nozzle is moving relative to the spray nozzle.

These buffer zones may differ in their extents in the direction of the air movement. This extent correlates preferably with the minimum distance of the non-target area belonging to the buffer zone. The greater the minimum distance of a non-target area, the greater also, preferably, the extent of the buffer zone in the direction of the air movement. This is represented illustratively and schematically in FIG. 3, FIG. 4 and FIG. 5.

Figure 3:
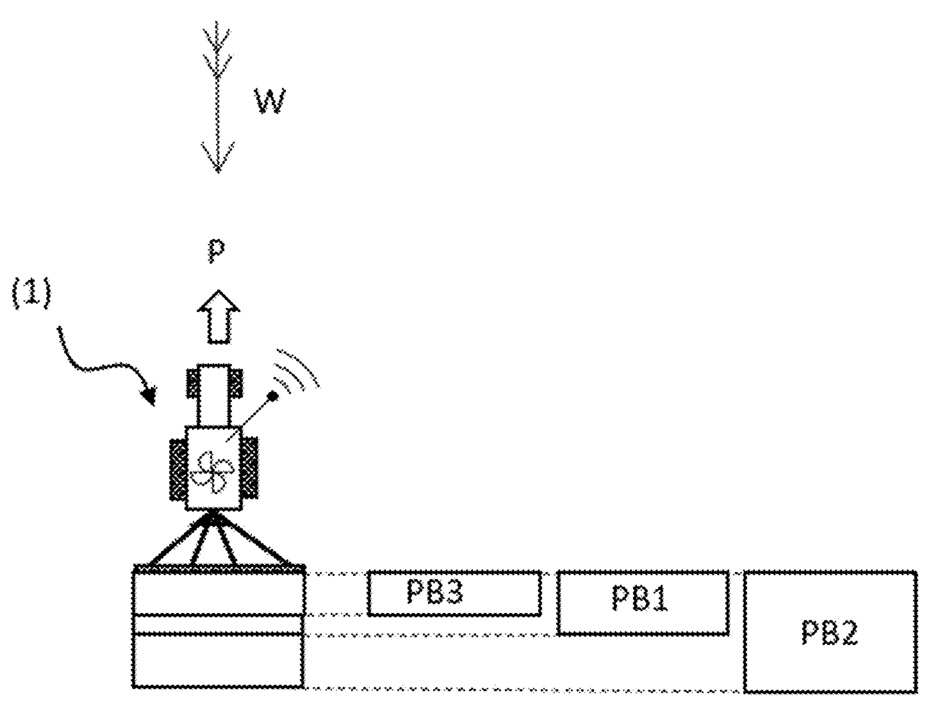
Figure 4:
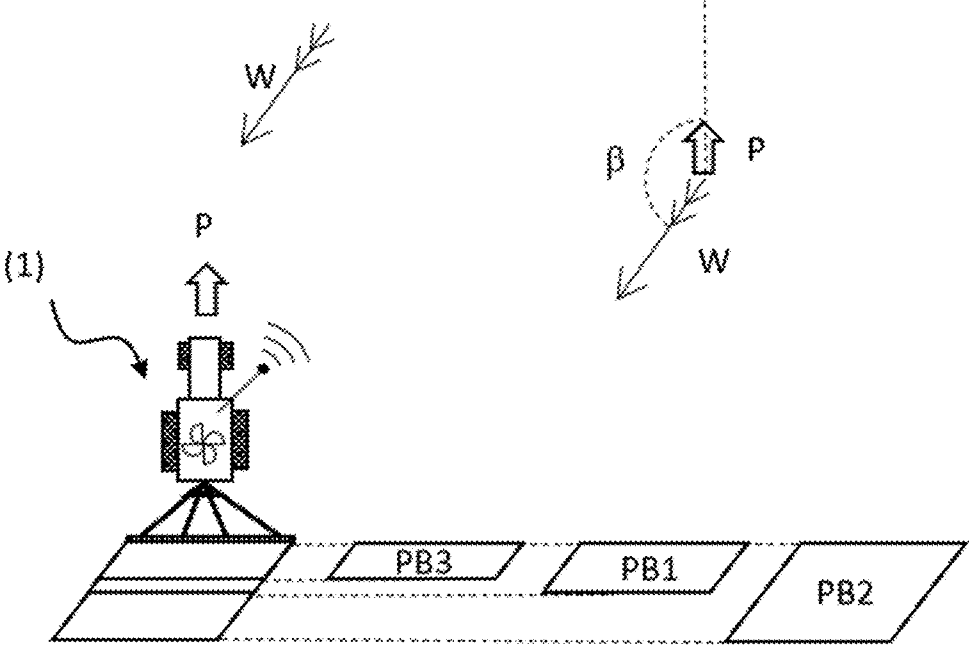
Figure 5:
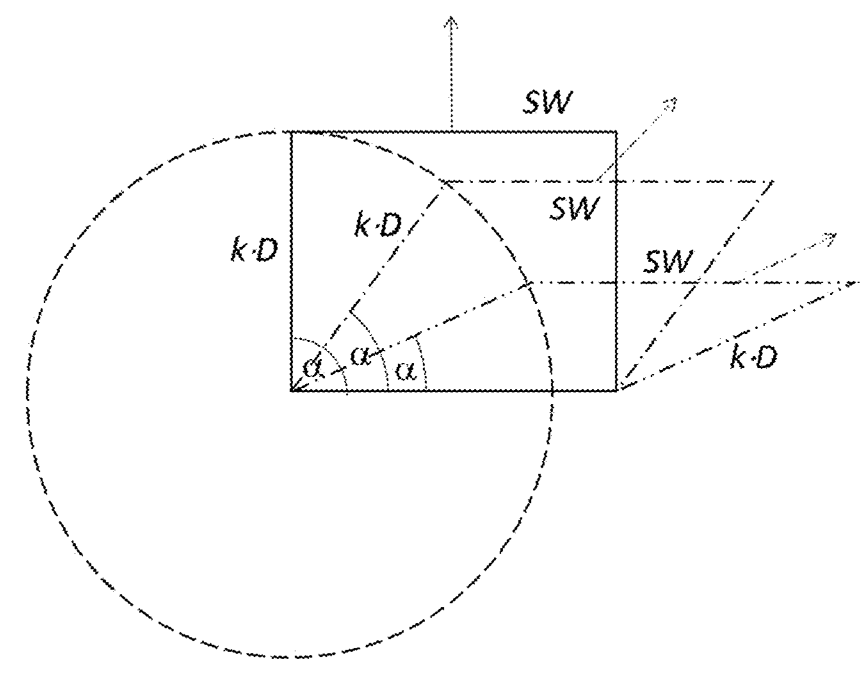

FIG. 3, FIG. 4 and FIG. 5 show, illustratively and schematically, different buffer zones as a function of the wind direction.

FIG. 3 shows the spray apparatus (1) from FIG. 2 in a smaller form. The apparatus moves in the direction of the arrow P. The arrow W indicates the direction in which the wind is moving; it is directed opposite (180°) to the movement direction of the spray apparatus. Extending from the spray bar of the spray apparatus (1) are three areas, in the direction in which the wind is moving.

The areas have different surface areas and different extents in wind direction. Because the areas overlap, they are represented for clarity a second time to the right of the spray apparatus in a fanned-out form. The areas carry the designations PB3, PB1 and PB2. Each of the areas defines a buffer zone. In FIG. 3: PB3<PB1<PB2. Each of the buffer zones corresponds to a non-target area. In this context the term "correspond" means, preferably, that the size of the buffer zone correlates with the minimum distance of the non-target area.

In FIG. 4 the situation has changed relative to FIG. 3 in that the wind direction, represented by the arrow W, has altered. The movement direction of the wind and the movement direction of the spray apparatus enclose an angle β of about 135°. Extending from the spray bar of the spray apparatus (1) are the three buffer zones, in the direction in which the wind is moving. The buffer zones each have the form of a parallelogram. In FIG. 3: PB3<PB1<PB2.

In the present example, the surface area $A_Z$ of a buffer zone for a non-target area Z is computed using the following formula:

$$A_Z = k \cdot SW \cdot D_Z \cdot \sin(\alpha)$$

In this formula, SW is the spray width, $D_Z$ is the minimum distance which is to be/must be observed from the non-target area Z, and α is the angle between the direction of the air movement and the direction of extent of the spray bar. The spray bar is typically arranged perpendicularly to the movement direction of the spray apparatus, i.e. typically: $\alpha=\beta-90°$, wherein β is the angle between the movement direction of the wind and the movement direction of the spray apparatus. The parameter k is a factor which may be dependent on the spray product used and/or dependent on the spray nozzle used and/or dependent on the application parameters and/or dependent on the wind velocity and/or dependent on the movement velocity of the spray apparatus. The relationships described are represented once again, illustratively and schematically, in FIG. 5 for a buffer zone. The three arrows shown in FIG. 5 indicate different wind directions. The parameter SW indicates the spray width. This is independent of the wind direction. The parameter D represents the minimum distance of the non-target area corresponding to the buffer zone. The product k·D is likewise independent of the wind direction. As a result of the change in the wind direction, there is a change in the angle α between the spray width and the wind direction and hence also in the orientation of the buffer zone and the surface area of the buffer zone. It is conceivable for the surface area to correlate to the wind velocity; it is conceivable for the surface area to rise if the wind velocity increases.

The buffer zones shown in FIG. 3, FIG. 4 and FIG. 5 represent a specific embodiment of the present invention. In the examples shown in FIG. 3, FIG. 4 and FIG. 5, a buffer zone (for each non-target area present) has been ascertained jointly for all the spray nozzles. With preference, separate buffer zones are ascertained for groups of spray nozzles or for individual spray nozzles. This is shown illustratively and schematically in FIG. 6, FIG. 7, FIG. 8 and FIG. 9.

Figure 6:
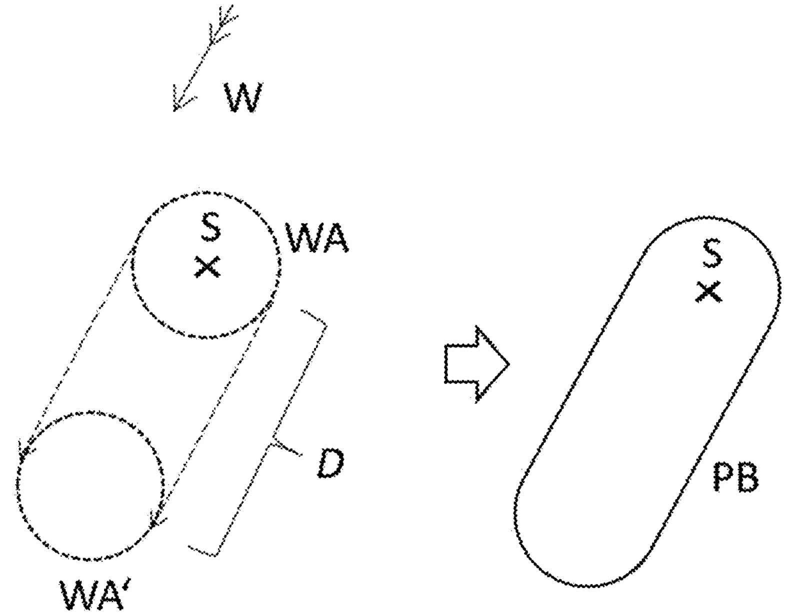

FIG. 6 shows schematically an example of the determination of a buffer zone for a non-target area. Mandated for the non-target area is a minimum distance D which is to be/must be observed on application of a spray product. In the example shown in FIG. 6, a buffer zone is ascertained for an individual spray nozzle. The position of the spray nozzle S is marked with an x. A wetting area WA is determined for the spray nozzle S. A wetting area of this kind may be, for example, the standstill wetting area, i.e. the area which the spray nozzle would wet with spray product on standstill of the spray apparatus. In the present example, the wetting area WA is a circle around the spray nozzle S. In a subsequent step, the wind direction is ascertained. This is indicated in the present example by the arrow W. In a next step, the wetting area WA is displaced in the wind direction. In the present example, the wetting area is displaced by the amount of the minimum distance of the corresponding non-target area. The displacement is represented in FIG. 6 by the dashed arrows and the resulting displaced area WA'. In the displacement, the wetting area WA sweeps an area PB. This area PB represents the buffer zone for the spray nozzle S.

Figure 7:
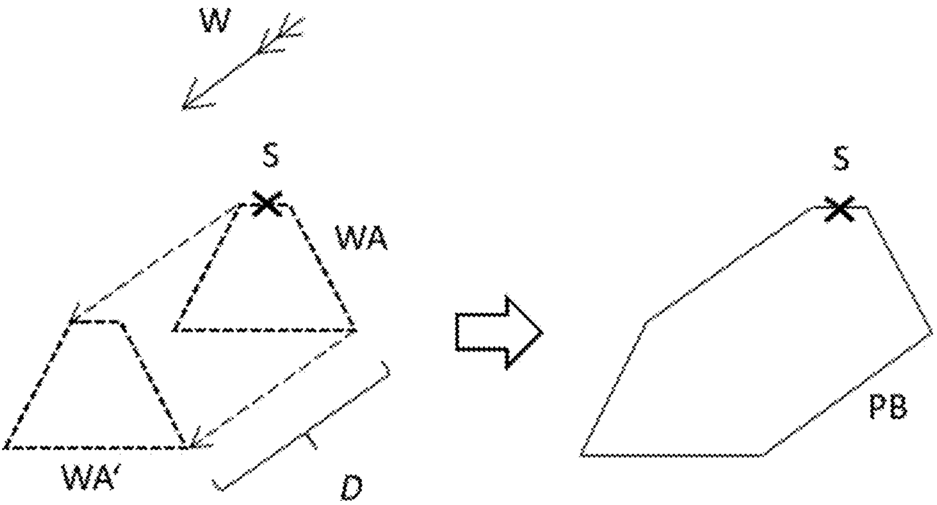
Figure 8:
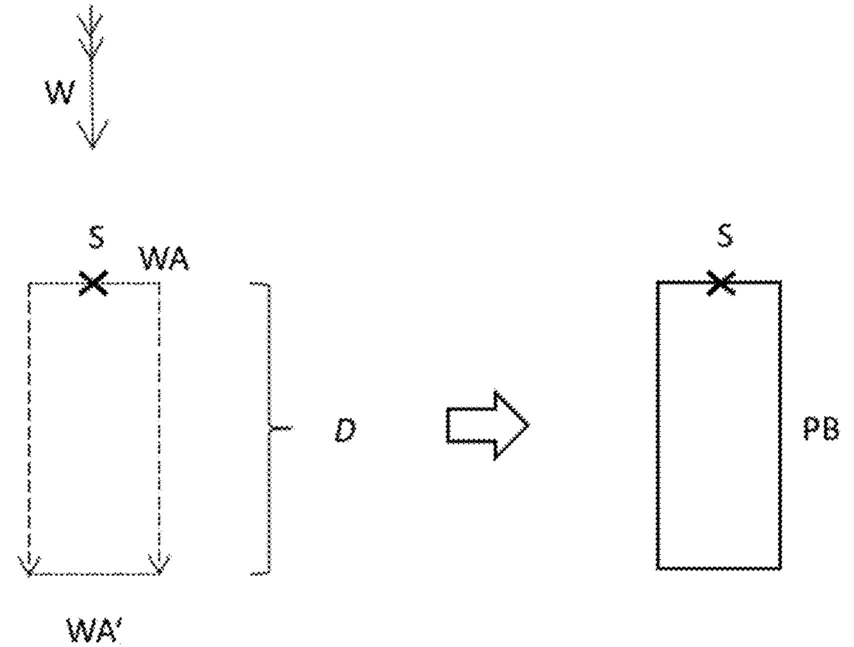
Figure 9:
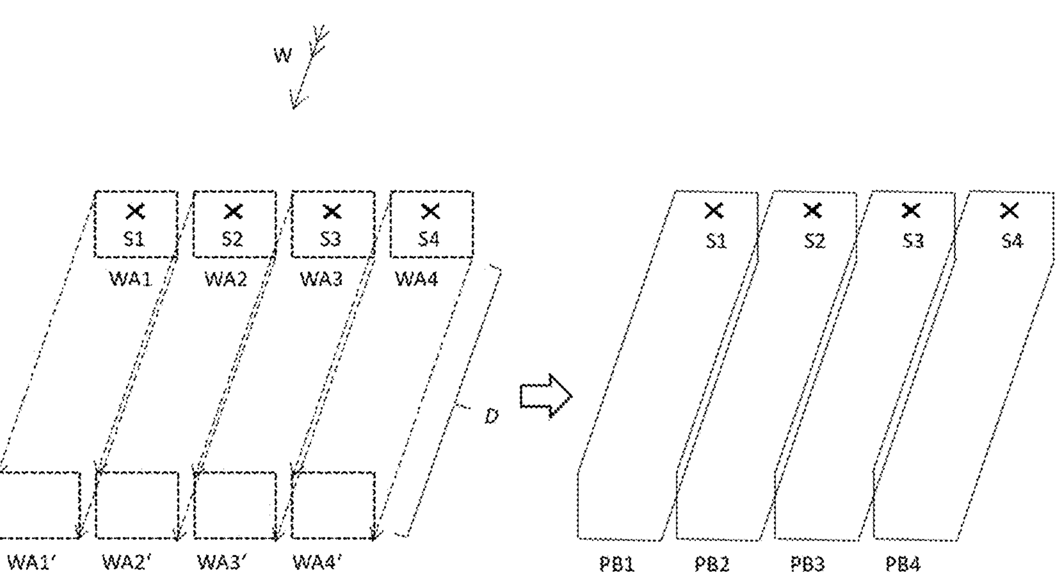

In FIG. 6 a circular wetting area has been defined, with the spray nozzle as the centre of the circle. Equally any other form is conceivable, and it is conceivable for the wetting area to be disposed differently in relation to the position of the spray nozzle. FIG. 7, FIG. 8 and FIG. 9 show further examples of wetting areas and the resultant buffer zones. The choice (definition) of the wetting area may be guided, for example, by the wetting area which actually arises in the event of application (and which may be ascertained empirically). It is conceivable for one form of the wetting area and one arrangement of the wetting area in relation to the at least one spray nozzle to be chosen (constructed) which comes as close as possible to reality (approximation). It is also conceivable to choose a form which can be easily and quickly drawn up by computer and displaced in order to minimize the computational complexity and to have a solution available which responds rapidly to altered conditions. Indeed, on any movement of the spray apparatus and/or on an alteration in the air movement, new buffer zones ought to be calculated immediately, on the basis of the altered conditions, in order to prevent off-target drift. One preferred form of a wetting area, which not only comes close to reality but also permits rapid calculation of buffer zones and rapid ascertainment of overlaps between buffer zones and non-target areas, is a polygon. In FIG. 7 a trapezium has been chosen for the form of the wetting area— the resulting form of the buffer zone is a hexagon. It is also conceivable for the form chosen for the wetting area to be a square, a rectangle, a parallelogram, a triangle, a pentagon, generally an n-gon (where n is an integer greater than three), an ellipsoid or another form. Nor is it absolutely necessary for the wetting area to be two-dimensional; a one-dimensional form is also conceivable, as shown in FIG. 8. FIG. 8, as a further example, shows the construction of a buffer zone starting form a straight line WA as wetting area. The resulting buffer zone has the form of a rectangle (as shown in FIG. 8), or the form of a parallelogram in the event that the wind direction is aslant (not at an angle of 90° or 0°) relative to the line WA. It is also conceivable for a curved wetting area to be chosen.

Figure 10:
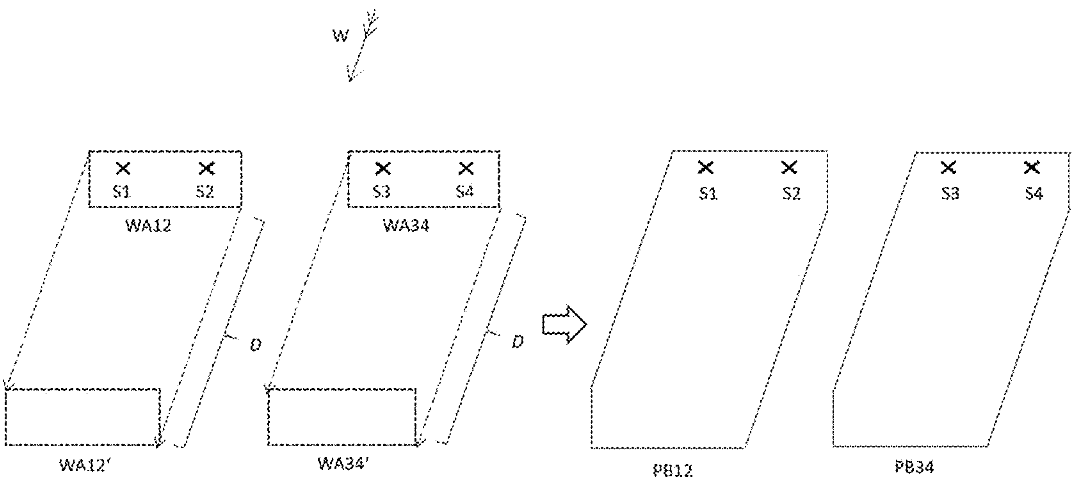

FIG. 9 shows illustratively and schematically the construction of buffer zones for an arrangement of spray nozzles. In the present example, four spray nozzles S1, S2, S3 and S4 are arranged at a uniform distance from one another along a straight line. Defined for each spray nozzle is a wetting area in the form of a rectangle. The wetting areas carry the reference symbols WA1, WA2, WA3 and WA4. Each wetting area is displaced by the amount of the minimum distance D in wind direction (indicated by the arrow W); this produces the resultant areas WA1', WA2', WA3' and WA4'. In the displacement, the areas WA1, WA2, WA3 and WA4 each sweep an area which is equated to a respective buffer zone. The buffer zones in the present example are in the form of a hexagon and carry the reference symbols PB1, PB2, PB3 and PB4. In the present example, the buffer zones overlap (PB1 with PB2, PB2 with PB1 and PB3, PB3 with PB3 and PB4, PB4 with PB3). An overlap of this kind is not mandatory, however. In the example shown in FIG. 9, a buffer zone has been ascertained for each spray nozzle. It is also conceivable for a buffer zone to be constructed for a group of spray nozzles. This is represented illustratively and schematically in FIG. 10. FIG. 10 shows illustratively and schematically the construction of buffer zones for a group of spray nozzles. In the present example, four spray nozzles S1, S2, S3 and S4 are arranged along a straight line. For the spray nozzles S1 and S2, a joint wetting area WA12 is defined. For the spray nozzles S3 and S4, a joint wetting area WA34 is defined. The wetting areas WA12 and WA34 are each displaced in the wind direction by the amount of the minimum distance D. In the displacement, the wetting areas WA12 and WA34 each sweep an area which is set as the buffer zone. The buffer zone resulting for the spray nozzles S1 and S2 is labelled with the reference symbol PB12; the buffer zone resulting for the spray nozzles S3 and S4 is labelled with the reference symbol PB34.

In the examples shown in FIG. 6, FIG. 7, FIG. 8, FIG. 9 and FIG. 10, the wetting areas have been displaced in the wind direction by the amount of the minimum distance D. It is also conceivable for the wetting areas to be displaced by the amount p·D, where D is still the minimum distance of the corresponding non-target area and p is a parameter which correlates, for example, with the wind velocity and/or the movement velocity of the spray apparatus and/or with another application parameter.

In the examples shown in FIG. 6, FIG. 7, FIG. 8, FIG. 9 and FIG. 10, for the construction of the buffer zones, the wetting areas have been defined in each case and have been displaced in the wind direction by the amount of the minimum distance D. It is also conceivable for buffer zones to be defined and generated independently of a wetting area. This is shown illustratively and schematically in FIG. 11.

Figure 11:
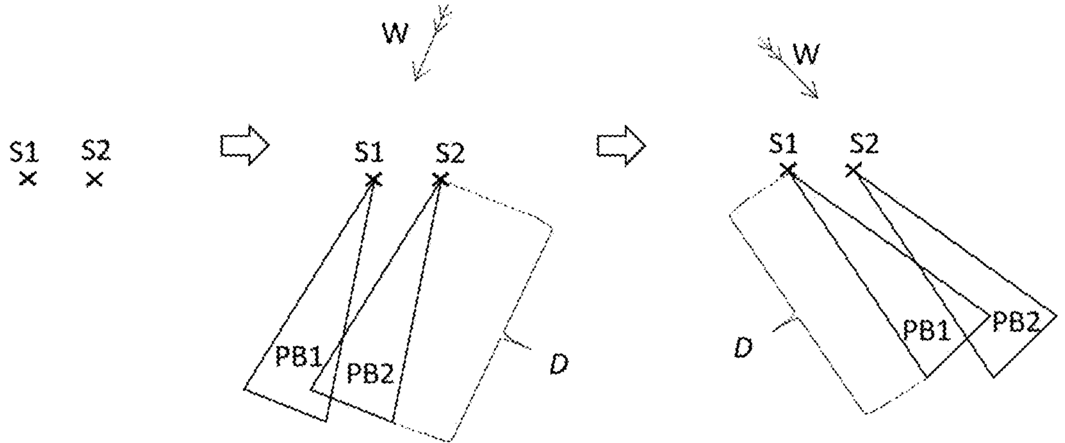

FIG. 11 shows an example of the construction of a buffer zone for two spray nozzles disposed at a distance from one another. The spray nozzles carry the reference symbols S1 and S2. In a first step, the wind direction is ascertained. This is indicated in FIG. 11 by the arrow W. In a further step, buffer zones are generated which extend from the spray nozzles in the wind direction. The buffer zones carry the reference symbols PB1 and PB2. The buffer zones in the present example have the form of an (isosceles) triangle, with the height of the triangle (the height between the two sides of equal length) corresponding to the amount of the minimum distance D. Here as well, different forms are conceivable for the buffer zones, such as, for example, a rectangle, a trapezium and many others. In one preferred embodiment, the form of the buffer zone is mirror-symmetrical, with the axis of mirror symmetry running along the wind direction and having a length which corresponds to the minimum distance D. In one preferred embodiment the buffer zone has the form of a polygon, with at least one side (edge) of the polygon running along the wind direction and having a length which corresponds to the minimum distance D. Since a spray apparatus moves during application of a spray product, there is continual change in the position of the spray apparatus and hence also in the position of the at least one spray nozzle and hence also in the position of each buffer zone.

Furthermore, the direction and/or the velocity of the air surrounding the spray apparatus may likewise change continually. If there is a change in the direction of the air movement, then there is a change in the orientation of the buffer zone and possibly also in the surface area of the buffer zone. The buffer zone always extends from the at least one spray nozzle in the direction of the air movement. The term “extend” here, as shown by the preceding examples, means that the buffer zone has at least one side or one height which is oriented parallel to the direction of the air movement. Typically this side has a length which corresponds to or at least correlates with the minimum distance D of the corresponding non-target area.

The present invention takes account of the circumstance that the buffer zones may change continually. The buffer zones are therefore recalculated continually and automatically. “Continually” (synonymously: continuously) in this context means a recalculation at least every 10 seconds, preferably at least every 5 seconds. It is conceivable for the frequency of the recalculation to be coupled to the movement velocity of the spray apparatus and/or to the velocity of the air movement, preferably in such a way that the frequency of recalculation rises when the movement velocity rises and/or when the velocity of the air movement rises. It is conceivable for the recalculation to be coupled to the velocity of the capture and/or ascertainment of the data used to calculate the buffer zones. It is conceivable for a recalculation to take place whenever new data has been captured and/or transmitted.

For each recalculated buffer zone, examination takes place (likewise automatically and continuously) as to whether the buffer zone overlaps with the corresponding non-target area. In the event of such overlap, there is a danger of spray product entering the non-target area.

Figure 12:
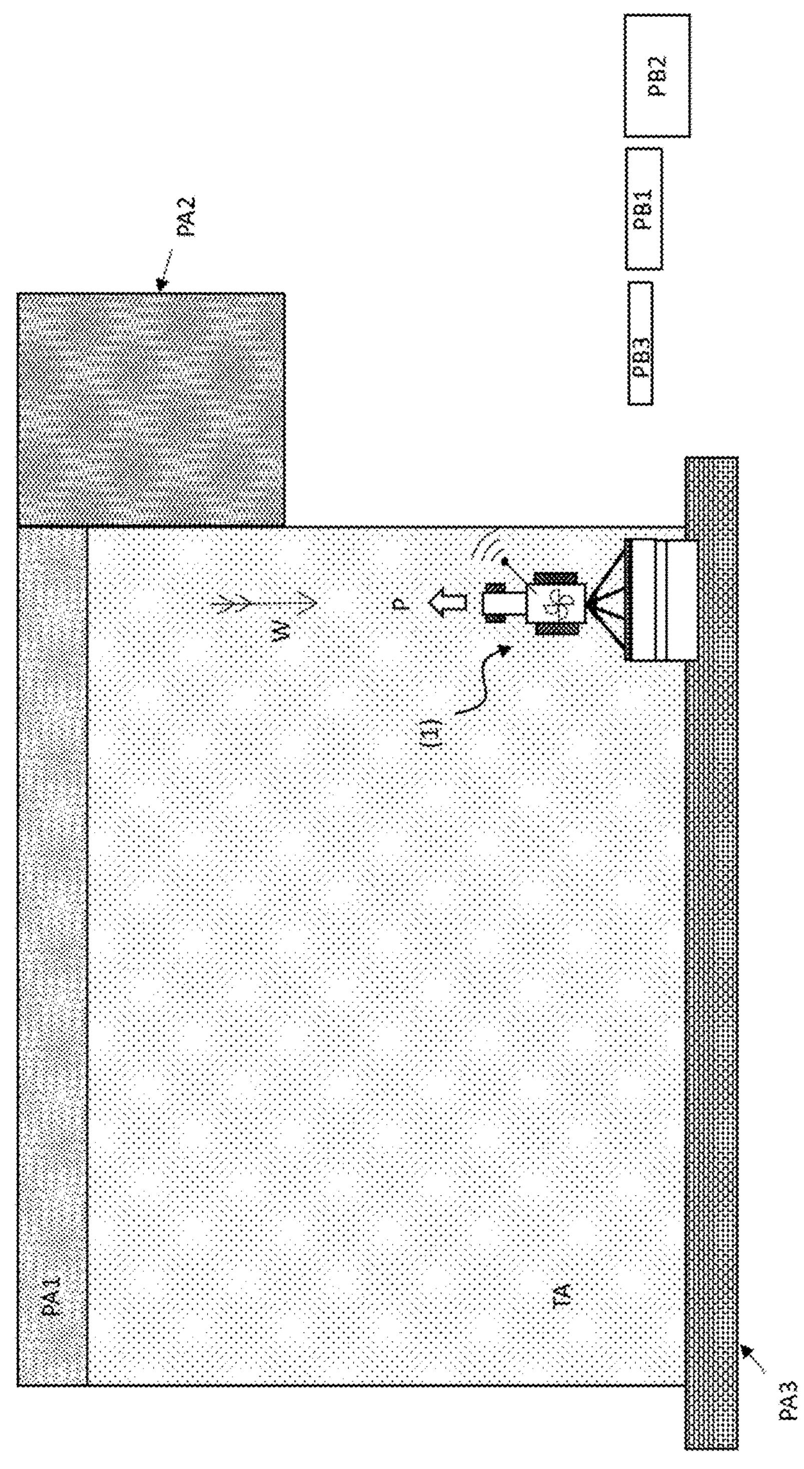

FIG. 12 shows illustratively and schematically the spray apparatus (1) from FIG. 2, which moves within the target area (TA) from FIG. 1. The movement direction is indicated by the arrow P. Wind is directed opposite to the movement direction of the spray apparatus (1) (and is represented by the arrow W). Three buffer zones (PB1, PB2, PB3) extend from the spray bar of the spray apparatus (1) in the direction in which the wind is moving. The surface areas of the buffer zones correlate with the minimum distances of the non-target areas (PA1, PA2, PA3). Each buffer zone has two sides, which are oriented parallel to the wind direction and have lengths corresponding preferably to the minimum distances from the non-target areas (PA1, PA2, PA3). The minimum distances can be taken from FIG. 1; for the sake of clarity, they are not shown in FIG. 12. In the present example there is an overlap between the buffer zone PB2 and the non-target area PA3. However, since the buffer zone PB2 does not correspond to the non-target area PA3, this overlap is uncritical. In the present example, there is no overlap between a buffer zone and the corresponding non-target area: PB1 does not overlap with PA1, PB2 does not overlap with PA2, and PB3 does not overlap with PA3.

Figure 13:
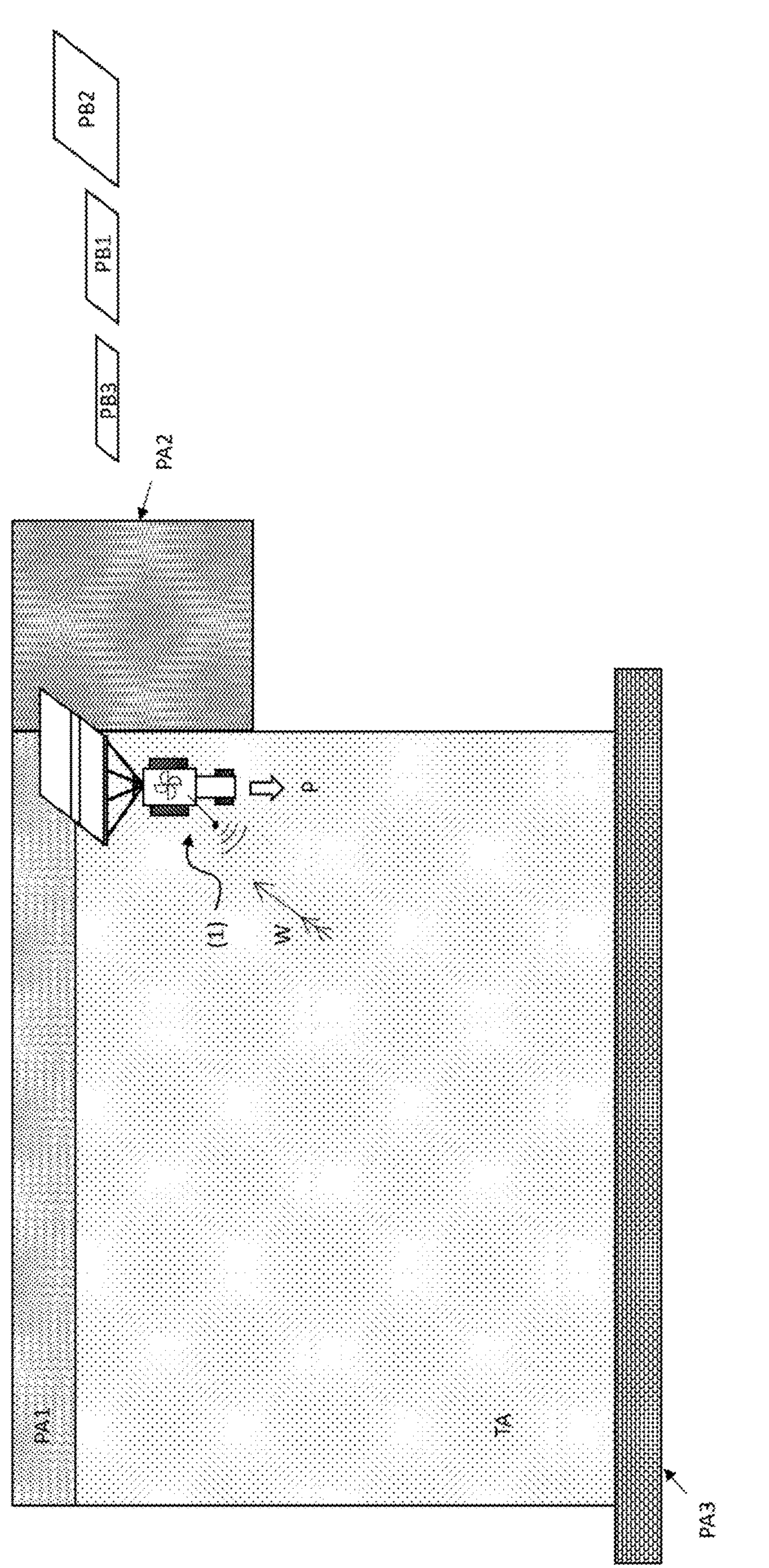

FIG. 13 shows illustratively and schematically the spray apparatus (1) from FIG. 2, which moves within the target area (TA) from FIG. 1. In comparison to FIG. 12, the situation has altered as follows: the spray apparatus is moving in a different direction (represented by the arrow P). The wind is moving in a different direction (represented by the arrow W). There is an overlap between the buffer zone PB3 and the non-target area PA2. This is uncritical, since the buffer zone PB3 does not correspond to the non-target area PA2. There is an overlap between the buffer zone PB1 and the non-target area PA2. This is uncritical, because the buffer zone PB1 does not correspond to the non-target area PA2. There is an overlap between the buffer zone PB2 and the non-target area PA1. This is uncritical, because the buffer zone PB2 does not correspond to the non-target area PA1. There is an overlap between the buffer zone PB1 and the non-target area PA1. This is critical, because the buffer zone PB1 and the non-target area PA1 correspond to one another. There is an overlap between the buffer zone PB2 and the non-target area PA2. This is critical, because the buffer zone PB2 and the non-target area PA2 correspond to one another.

An overlap of one buffer zone with a corresponding non-target area is to be/must be prevented, since it may result in spray product entering the non-target area.

Measures are therefore taken in order to prevent the overlap or to diminish the danger of spray product being carried into a non-target area. Such a measure typically relates to a change in one or more application parameters.

Such a measure may involve, for example, the spraying operation being interrupted, meaning that spray product is no longer delivered.

Such a measure may involve one or more spray nozzles being closed. Spray product is no longer delivered via these spray nozzles. A closed spray nozzle has either no buffer zone or a buffer zone with lesser an extent in the wind direction than an opened spray nozzle. By closing the spray nozzles or shutting a valve in front of a spray nozzle, therefore, it is possible to prevent an overlap of buffer zone with non-target area.

Such a measure may involve altering the nozzle opening of one or more spray nozzles and/or altering the pressure upstream of the nozzle opening, in order to alter the distribution of the emerging spray product and/or the droplet size of the emerging spray product and/or the velocity at which spray product emerges, so that the spray product moves faster to the ground and is less susceptible to wind.

Such a measure may involve switching one or more spray nozzles. Often there are multiple spray nozzles mounted, for example, in the form of a revolver on a spray head. The spray nozzles on the spray head may have different spraying characteristics; it is conceivable, for example, for there to be a standard nozzle and one or more specific spray nozzles such as drift-reducing nozzles, for example.

A further measure may involve reducing the movement velocity of the spray apparatus.

A further measure may involve switching the spray product. Different spray product may be subject to different minimum distances to be observed with respect to non-target areas. Correspondingly, different spray products may be distinguished by buffer zones of different sizes. It is therefore conceivable that an overlap can be prevented by choosing a spray product having a smaller buffer zone.

Figure 14:
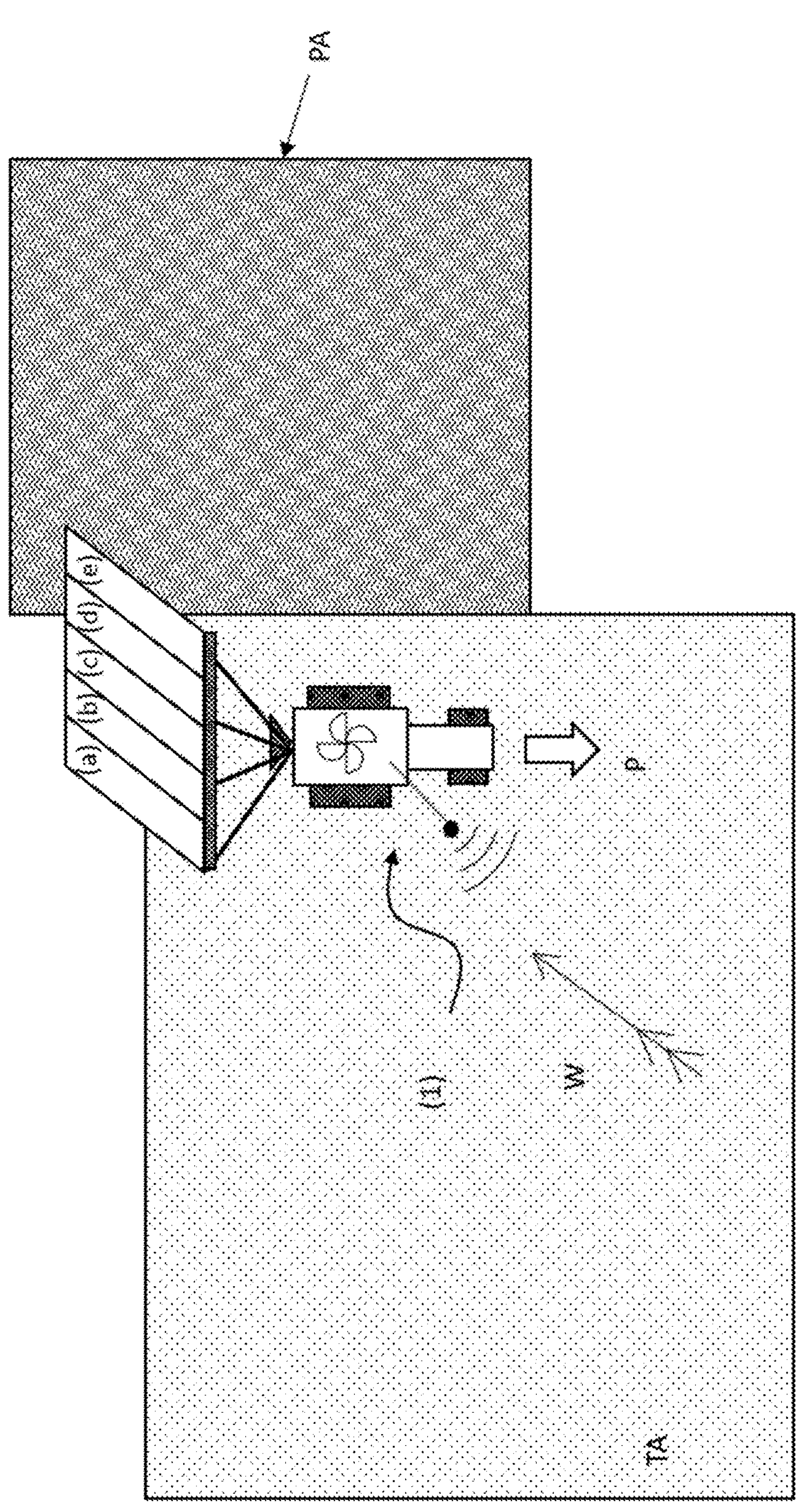
Figure 15:
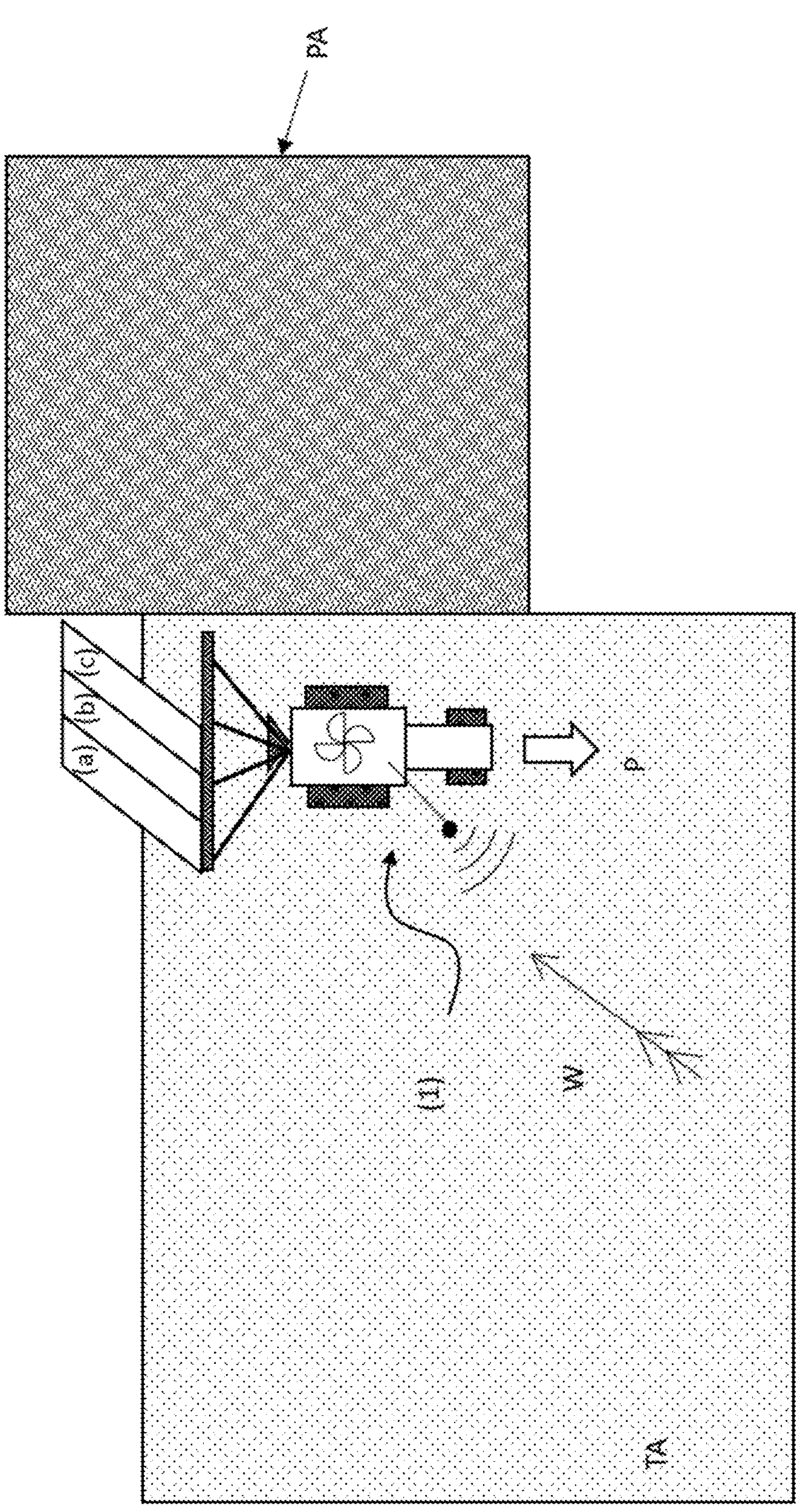

FIG. 14 and FIG. 15 show illustratively and schematically an alteration of application parameters for preventing an overlap of one or more buffer zones with a corresponding non-target area. FIG. 14 and FIG. 15 show the spray apparatus (1) from FIG. 2, which moves within the target area (TA) from FIG. 1. The spray apparatus moves in the direction shown by the arrow P. The wind moves in the direction shown by the arrow W. The spray apparatus has five spray nozzles or five groups of spray nozzles, which are mounted on a spray bar (the spray nozzles are not shown explicitly in FIG. 14 and FIG. 15). For each spray nozzle or group of spray nozzles, a buffer zone has been ascertained (see FIG. 14). The buffer zones have the form of parallelograms and extend from the spray nozzles (or groups of spray nozzles) in the wind direction. Each parallelogram has two sides, which are oriented parallel to the wind direction. The length of these sides correlates preferably with the minimum distance which must be/is to be observed relative to the non-target area PA; with particular preference the length of the sides is the same as the minimum distance. The buffer zones are given the reference symbols (a), (b), (c), (d) and (e). The buffer zones (d) and (e) overlap with the corresponding non-target area PA (see FIG. 14). In order to prevent this overlap, it is possible to change the application parameters in such a way that the spray nozzles with the buffer zones (d) and (e) are shut off. Shutting off the spray nozzles means that spray product is no longer applied via these spray nozzles. Correspondingly, the buffer zones for these spray nozzles disappear. This is shown in FIG. 15; the shutting-off of the spray nozzles causes the buffer zones (d) and (e) to disappear, leaving the buffer zones (a), (b) and (c). These zones do not overlap with the corresponding non-target area PA. Off-target drift into the non-target area PA is prevented.

In one preferred embodiment, in addition to the buffer zones that are dependent on air movements, a buffer zone independent of air movements is ascertained. This zone is ascertained preferably for bodies of water in, on and/or near to a target area, or for the filter strips bordering on the bodies of water. In the cultivation of crop plants, a green strip is typically planted between the field for the crop plants and the body of water, with the ability to act as a filter for crop protection products and/or fertilizers; in this description, it is also referred to as a filter strip (or vegetated filter strip). Precipitation on the field may pick up crop protection products and/or fertilizers. The filter strip is able to prevent the water runoff, enriched with crop protection product and/or fertilizer, from carrying unwanted substances into the body of water, and it does this by filtering out the unwanted substances. Application of spray product in a filter strip of this kind is to be prevented. This is achieved through the buffer zone independent of air movements (especially of winds).

Figure 16:
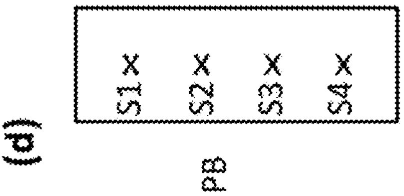
Figure 16:
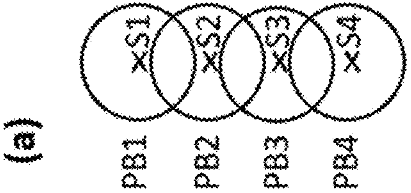

The construction of a buffer zone for a filter strip is shown illustratively and schematically in FIG. 16. FIG. 16 (*a*), FIG. 16 (*b*), FIG. 16 (*c*) and FIG. 16 (*d*) show four different examples of buffer zones independent of air movement. In all cases there are four spray nozzles S1, S2, S3 and S4 present, their position being marked by an x. In the case of FIG. 16 (*a*) there is a separate buffer zone (PB1, PB2, PB3, PB4) for each spray nozzle. Each buffer zone has the form of a circle, with the position of the spray nozzle as the circle centre point. The radius of the circle corresponds preferably at least to the width of the filter strip. The filter strip typically possesses a defined width B. This width B is preferably the distance between the outer field margin and the outer water body margin. The width B of the filter strip may vary over the length of the filter strip. In the case of FIG. 16 (*b*), FIG. 16 (*c*) and FIG. 16 (*d*) there is a single buffer zone for all four spray nozzles. In the case of FIG. 16 (*b*), the buffer zone has the form of two semicircles, which are arranged at a distance from one another, as mirror images of one another, with the loose ends of the semicircles being joined to one another by straight lines. The positions of the spray nozzles S1 and S4 correspond preferably to the circle centre points of the two semicircles. The radii of the semicircles correspond preferably at least to the width of the filter strip. The buffer zone PB in FIG. 16 (*b*) has the form of an envelope of the circles in FIG. 16 (*a*). In the case of FIG. 16 (*c*), the form of the envelope from FIG. 16 (*b*) is approximated by an octagon; in the case of FIG. 16 (*d*), the form of the envelope from FIG. 16 (*b*) is approximated by a rectangle. Other forms as well, more particularly other polygons, are conceivable. The form and size of a buffer zone for filter strips may be chosen, for example, such that the distance between the position of the at least one spray nozzle and the outer edges is never less than a mandated value yet at the same time is kept small. The mandated value may be, for example, the width B of the filter strip, or a quantity which correlates with this.

Figure 17:
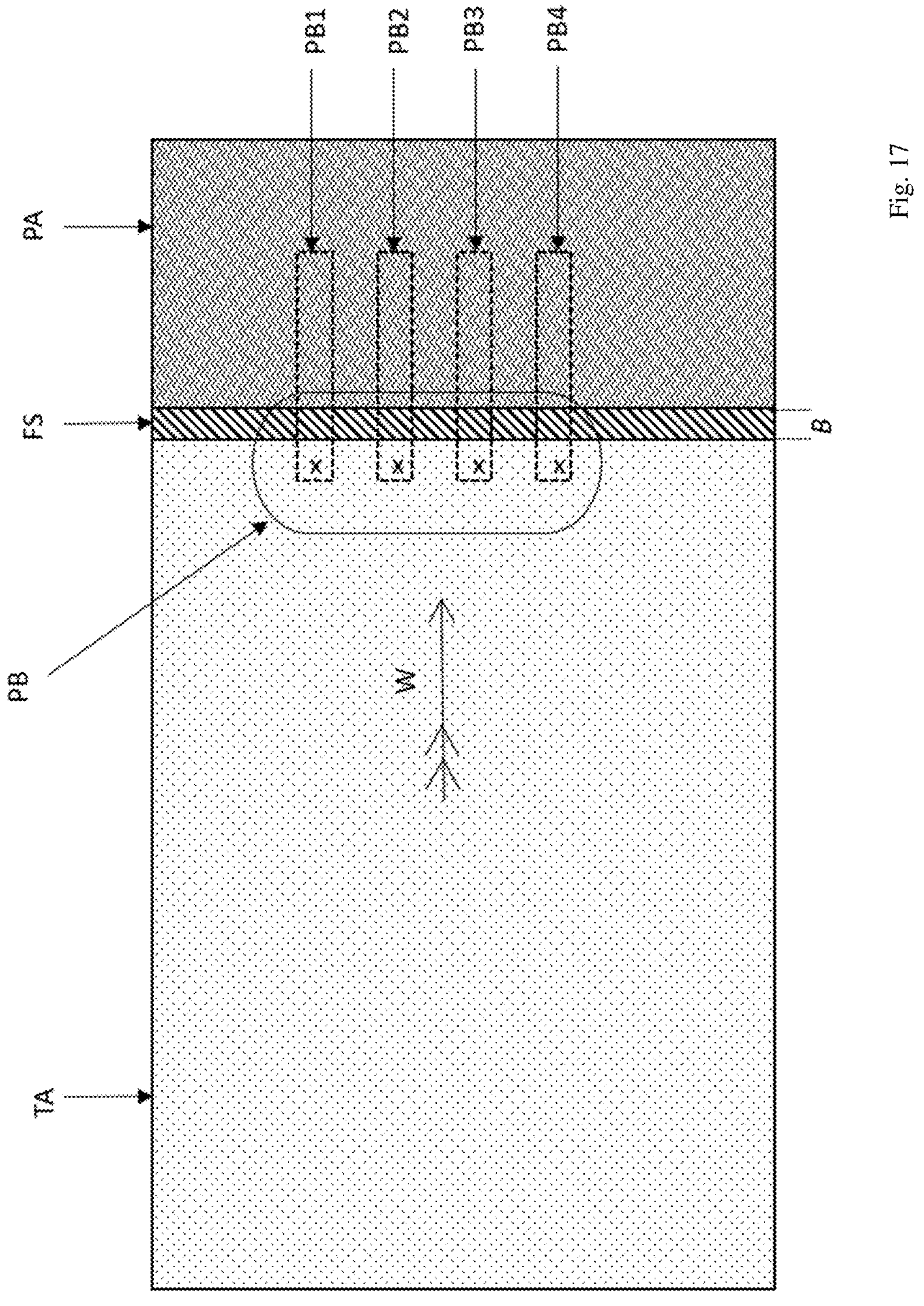
Figure 18:
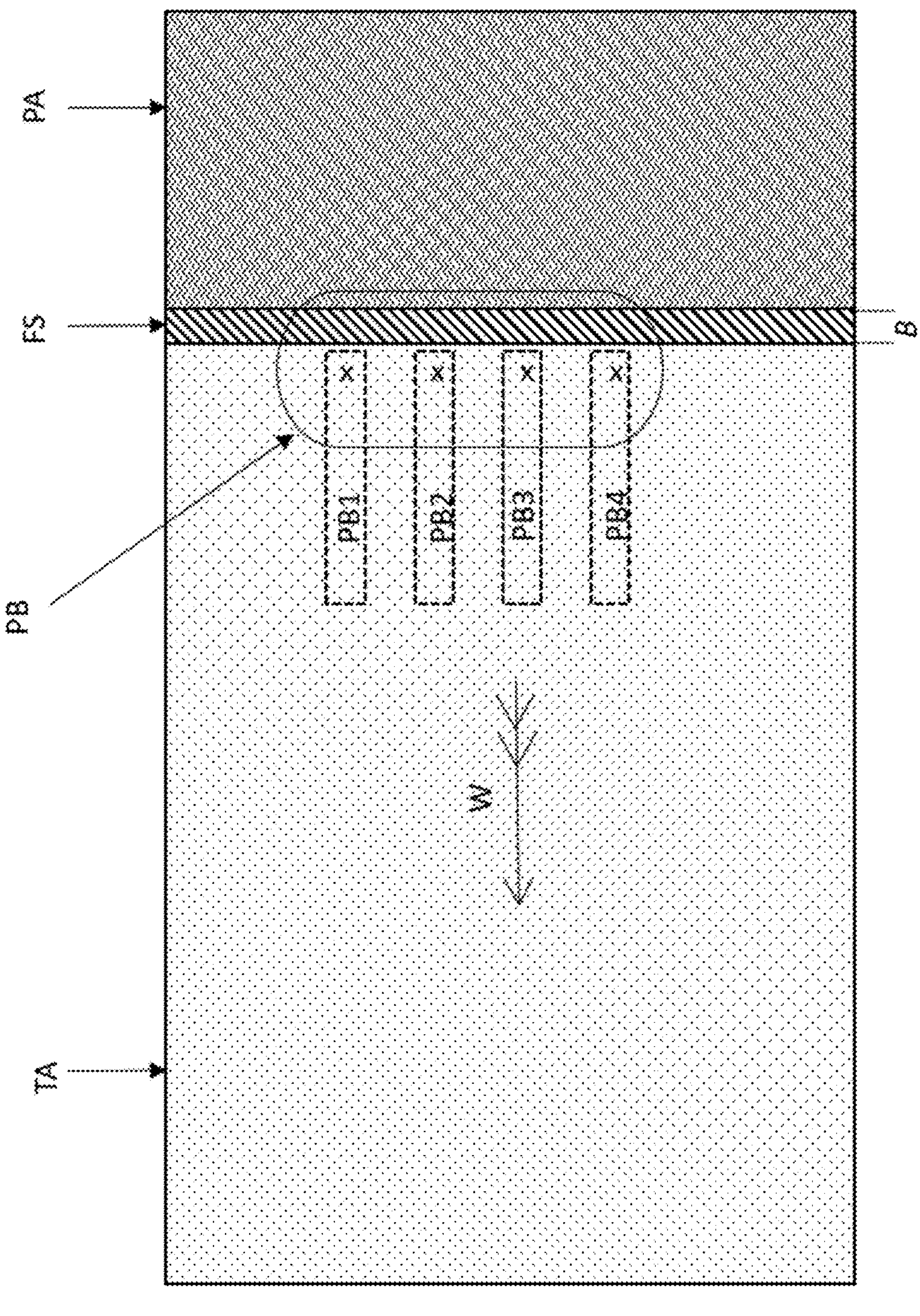

FIG. 17 and FIG. 18 show illustratively and schematically two different situations in the application of spray product in a target area near to a filter strip. The target area TA is separated by the filter strip FS from a (further) non-target area PA. Located in the target area TA is a spray apparatus having an arrangement of four spray nozzles. Of the spray apparatus, only the positions of the four spray nozzles are marked by crosses x. Assigned to the spray nozzles is a single, air movement-independent buffer zone PB. The arrangement of the four spray nozzles and of the buffer zone corresponds to those from FIG. 16 (*b*). Additionally, for each of the spray nozzles, there is a further buffer zone (PB1, PB2, PB3, PB4). These further buffer zones correspond to the non-target area PA, which in the present example is a body of water. The arrow W indicates the wind direction. The buffer zones PB1, PB2, PB3 and PB4 extend from the spray nozzles in the wind direction; their extent in the wind direction preferably corresponds to the minimum distance of the non-target area PA. There is an overlap of the buffer zones PB1, PB2, PB3 and PB4 with the corresponding non-target area PA. Measures must therefore be taken in order to prevent off-target drift in the non-target area PA. In the present case, this measure may involve, for example, all the spray nozzles being closed, so that no spray product emerges. FIG. 18 shows the same arrangement as FIG. 17, with the difference that the wind is now coming from the opposite direction and the buffer zones PB1, PB2, PB3 and PB4, correspondingly, are oriented likewise oppositely to the previous direction (that shown in FIG. 17). The orientation of the buffer zone PB has not altered; it is independent of the wind direction. There is no overlap of the buffer zones PB1, PB2, PB3 and PB4 with the corresponding non-target area PA. At this position in the target area TA, therefore, it would be possible to apply spray product, since the danger of off-target drift in the non-target area PA is small. The application of spray product at this position in the target area, however, might result in spray product entering the filter strip. The overlap of the buffer zone PB with the filter strip and with the non-target area PA indicates this danger. In the event of overlap of the buffer zones PB with the filter strip and/or with the non-target area PA, measures may be taken in order to prevent such overlap.

A spraying operation in a target area is preferably recorded. In the case of such recording, data is captured and stored. Data which is captured and stored, preferably for each position of the spray apparatus in the target area, comprises the prevailing wind direction in each case and also the spray nozzles which deliver spray product at the position. Further data which may be captured and stored comprises the (in each case present at the positions of the spray apparatus) movement velocity of the spray apparatus, application parameters (which spray product is delivered in which amount), distances from non-target areas, size and form of buffer zones and/or the like.

Through the capture and storage of the data it is possible to document the spraying operation, enabling demonstration before an authority, for example, that as a consequence of the dynamic drift control according to the present invention, it has been possible effectively to minimize the risk of off-target drift in a non-target area at each point in time in an application procedure.

Furthermore, for example, the user of the spray apparatus is able to recognize those locations in the target area which have received which quantities of spray product delivered. If, in the light of a risk of off-target drift, no spray product or less spray product than intended has been discharged in one area, the user is able to decide whether to deliver spray product in this area at a later point in time, when, for example, the wind conditions have changed, or whether to take alternative measures. It is also conceivable for the areas in which no spray product or too little spray product has been delivered to be visited automatically by one or more drones and/or sought out by one or more robots in order within these regions for measures to be taken which compensate the non-delivery or inadequate delivery of the spray product.

It is also conceivable for an examination to be made, on the basis of the data captured and stored, of which consequences arise from the non-delivery and/or inadequate delivery, in order to adapt future application procedures thereto. It is conceivable for regions in which too little spray product or none at all has been applied to no longer be sprayed in the future as well, since spraying is no longer worthwhile. It is likewise conceivable for a region in which too little spray product or none at all has been applied to be treated with more spray product and/or with a different spray product in the event of a subsequent application.

It is conceivable as well for an optimized route for the delivery of spray product to be ascertained on the basis of the data captured and stored, in which case the optimization may take place in relation to different target quantities, such as, for example, low delivery time, short paths, small size of subregions in which there is no delivery, and/or the like.

It is conceivable as well for an optimized route to be ascertained on the basis of one or more wind sensors before and/or during the execution of the application procedure. If, for example, at the beginning of the application procedure, the wind is favourable such that an application can be made near to a non-target area without any danger of off-target drift, the computer system of the invention is able to propose a route for which application takes place near to the non-target area first. It is also conceivable for the route to be adapted to changeable wind conditions during the application procedure, in order to maximize the proportion of the target area that is treated with spray product.

Figure 19:
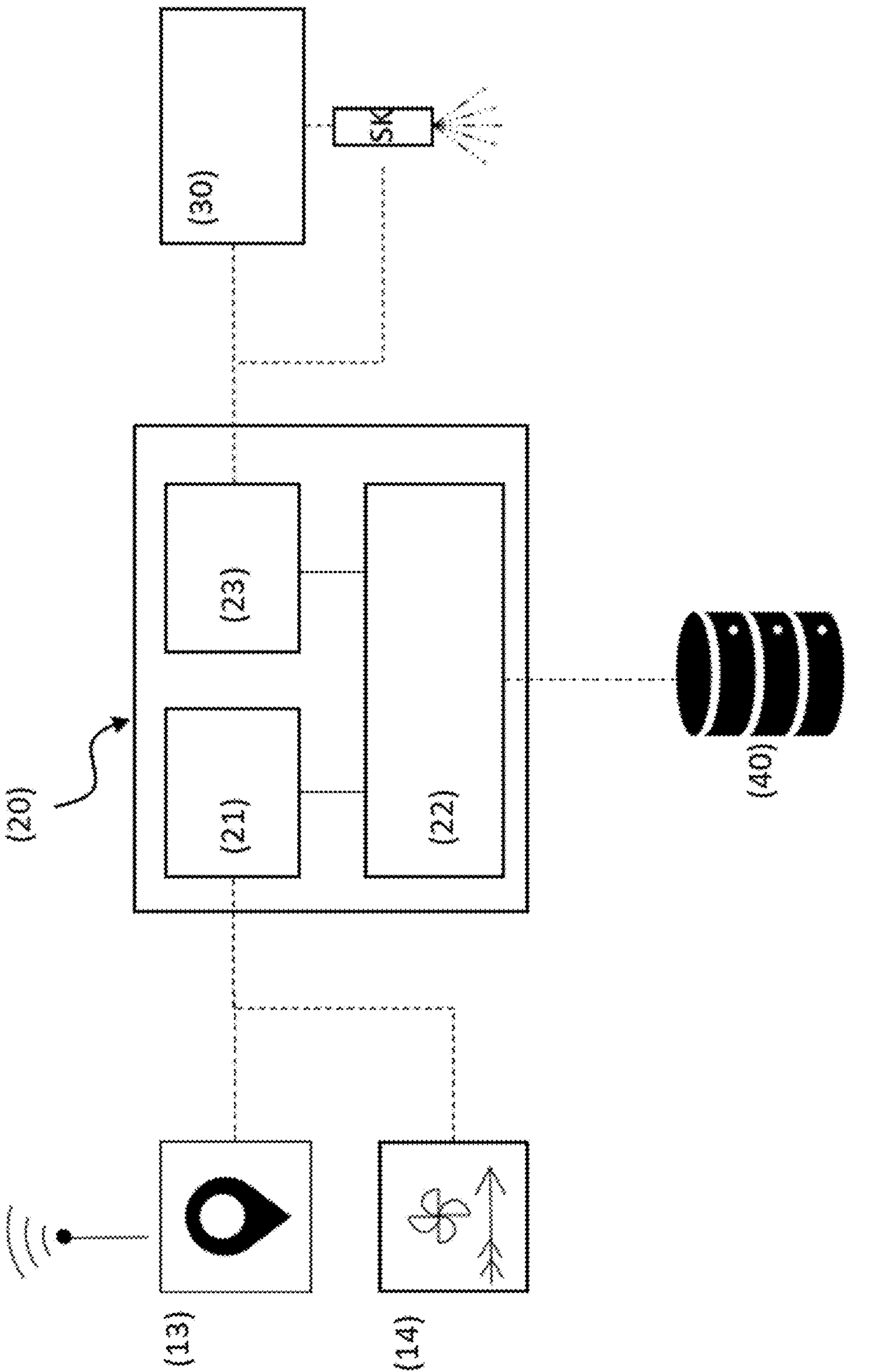

FIG. 19 shows schematically one embodiment of the computer system of the invention. The computer system (20) comprises a receiving unit (21), a control and processing unit (22) and an output unit (23).

The computer system (20) can be operated via the receiving unit (21), meaning that commands and/or information can be input via one or more input means (e.g. keyboard, mouse, microphone, touchscreen and/or the like). Further, the receiving unit (21) receives information on the position of one or more spray apparatuses and/or spray nozzles from one or more positional determination units (13) via one or more networks or directly, by cable connection and/or via radio. Further, the receiving unit (21) receives information on the direction of one or more air movements (e.g. wind) and, optionally, on the velocity of the air movement(s) from one or more air movement sensors (14) via one or more networks or directly, by cable connection and/or via radio.

The control and processing unit (22) is configured to use the data to ascertain buffer zones as described in the present description, and to examine whether one or more buffer zones overlap with one or more corresponding non-target areas. In the event of an overlap, the control and processing unit (22) is configured to cause the output unit (23) to output one or more signals which lead to application parameters being altered. In this context it is conceivable for the signals to be transmitted directly to components (SK) for the delivery of spray product (e.g. valve, pump and/or the like) and/or to be transmitted to a separate control unit (30) for the delivery of spray product, said unit then in turn driving the components (SK).

By way of the output unit (23) it is possible, further, to output information to a user of the computer system (e.g. via a monitor, a printer, a speaker and/or the like).

The computer system (20) may be connected to a data memory (40) in order to store information on application procedures (e.g. for archiving purposes). The data memory (40) may be a constituent of the computer system (20) and/or may be connected to it by one or more networks.

It is conceivable for there to be more than one receiving unit, more than one control and processing unit, more than one output unit and more than one data memory.

The computer system (20) may be a constituent of the spray apparatus of the invention or may be independent from it.

The computer system (20) is configured by the computer program product of the invention to execute the functions described in this description.

What is claimed is:

1. A method comprising the steps of:

applying a spray product in accordance with defined application parameters in a target area by means of a spray apparatus, wherein the spray apparatus comprises at least one spray nozzle and the target area comprises at least one non-target area, and/or borders on at least one non-target area and/or is located in a vicinity of at least one non-target area, wherein each non-target area is characterized by a minimum distance that extends from the non-target area into the target area and that is to be observed by the spray apparatus to inhibit application of the spray product in the non-target area;

during the applying:

determining a direction of an air movements;

determining a position of the at least one spray nozzles;

for each non-target area present: ascertaining a buffer zone specific to the non-target area, wherein the buffer zone correlates to the minimum distance of the non-target area that is to be observed by the spray apparatus to inhibit application of the spray product in the non-target area, and wherein the buffer zone extends from the at least one spray nozzle in the direction of the air movements;

examining whether there is an overlap between the at least one non-target area and its corresponding buffer zones;

in the event of an overlap: adapting application parameters to prevent the overlaps;

continuing the applying using the adapted application parameters.

2. The method according to claim 1, wherein the spray apparatus comprises a plurality of spray nozzles, with separate buffer zones being ascertained for groups of spray nozzles and/or for individual nozzles.

3. The method according to claim 1, wherein as well as the direction of the air movement, an air movement velocity is determined and the extent of the buffer zone in the direction of the air movement correlates with the air movement velocity.

4. The method according to claim 1, wherein the buffer zone has the form of a polygon.

5. The method according to claim 1, wherein the step of ascertaining a buffer zone for the non-target area comprises the following substeps:

ascertaining a wetting area;

displacing the wetting area in the direction of the air movement by a defined amount;

ascertaining an area which is swept during the displacement;

setting the area as the buffer zone.

6. The method according to claim 5, wherein the wetting area has a circular, elliptical, polygonal or linear form.

7. The method according to claim 5, wherein the wetting area corresponds to a standstill wetting area.

8. The method according to claim 1, wherein the air movement is wind.

9. The method according to claim 1, wherein at least one air movement-independent buffer zone is ascertained, the extent of which, starting from the position of the at least one spray nozzle, corresponds at least to a width of a filter strip, and, during the applying, examination is made as to whether the air movement-independent buffer zone overlaps with the filter strip and/or with a non-target area bordering on the filter strip and, in the event of an overlap, the application parameters are altered.

10. The method according to claim 1, wherein the application parameters are selected from the group consisting of the following: type and form of the at least one spray nozzle, number of spray nozzles used, arrangement of the spray nozzles, spray pressure, exit velocity of the spray product from the at least one spray nozzle, type of spray product and/or movement velocity of the spray apparatus.

11. The method according to claim 1, wherein the step of adapting application parameters to prevent the overlap implies one or more of the following measures:

halting or interrupting the applying;

halting the exit of spray product from one or more spray nozzles;

altering the opening of the at least one spray nozzles;

altering the spray pressure of the at least one spray nozzles;

using a different spray nozzle or a plurality of different spray nozzles;

changing the movement velocity of the spray apparatus;

changing the movement direction of the spray apparatus;

changing the spray product.

12. A spray apparatus comprising:

means for moving the spray apparatus in or over a target area, with the target area comprising at least one non-target area, and/or bordering on at least one non-target area and/or being located in a vicinity of at least one non-target area, wherein each non-target area is characterized by a minimum distance that extends from the non-target area into the target area and that is to be observed by the spray apparatus to inhibit application of the spray product in the non-target area;

at least one spray nozzles;

means for delivering spray product via the at least one spray nozzles;

means for determining the position of the at least one spray nozzle in the target areas;

a sensor for ascertaining a direction of an air movements;

a control and processing units;

where the control and processing unit is configured continually to determine the position of the at least one spray nozzle in the target area during the application of spray product in accordance with defined application parameters, continually to receive measurement data on the direction of the air movement, and, on the basis of the position and of the measurement data received, to ascertain for each non-target area present a corresponding buffer zone specific to the non-target area, with the buffer zone extending from the at least one spray nozzle in the direction of the air movement, wherein a size of the buffer zone correlates to the minimum distance of the non-target area;

where the control and processing unit is configured to examine whether there is an overlap between the at least one non-target area and its corresponding buffer zone, and, in the event that there is at least one overlap, to alter the application parameters in such a way that there is no longer any overlap.

13. A computer system comprising:

a receiving unit;

a control and processing unit; and an output unit;

where the control and processing unit is configured to cause the receiving unit continually to ascertain a position of at least one spray nozzle on a spray apparatus in a target area, with the target area comprising at least one non-target area, and/or bordering on at least one non-target area and/or being located in a vicinity of at least one non-target area, wherein each non-target area is characterized by a minimum distance that extends from the non-target area into the target area and that is to be observed by the spray apparatus to inhibit application of the spray product in the non-target area, and where the spray apparatus moves in or over the target area and applies spray product in accordance with defined application parameters via the at least one spray nozzle;

where the control and processing unit is configured to cause the receiving unit continually to receive a direction of an air movement;

where the control and processing unit is configured to ascertain, on the basis of the position of the at least one spray nozzle and the direction of the air movement, for each non-target area present, a corresponding buffer zone specific to the non-target area, with the buffer zone extending from the at least one spray nozzle in the direction of the air movement, wherein a size of the buffer zone correlates to the minimum distance of the non-target area;

where the control and processing unit is configured to examine whether there is an overlap between the at least one non-target area and its corresponding buffer zone, and, in the event that there is at least one overlap, to alter the application parameters in such a way that there is no longer any overlap, or to cause the output unit to output one or more signals which lead to a change in the application parameters so that there is no longer any overlap.

14. A non-transitory computer program product comprising a computer program which can be loaded into a main memory of a computer system where it causes the computer system to execute the following steps:

ascertaining a position of at least one spray nozzle on a spray apparatus in a target area, with the target area comprising at least one non-target area, and/or bordering on at least one non-target area and/or being located in a vicinity of at least one non-target area, with the spray apparatus moving in or over the target area and applying spray product in accordance with defined application parameters via the at least one spray nozzle, and wherein each non-target area is characterized by a minimum distance that extends from the non-target area into the target area and that is to be observed by the spray apparatus to inhibit application of the spray product in the non-target area;

receiving a direction of an air movement;

for each non-target area present: ascertaining a buffer zone specific to the non-target area on the basis of the position of the at least one spray nozzle and of the direction of the air movement, with the buffer zone extending from the at least one spray nozzle in the direction of the air movement, and wherein a size of the buffer zone correlates to the minimum distance of the non-target area;

examining whether there is an overlap between the at least one non-target area and its corresponding buffer zones;

in the event that there is at least one overlap: outputting one or more signals which lead to an alteration of the application parameters so that there is no longer any overlap.

* * * * *